United States Patent
Sanctuary

[15] 3,654,915
[45] Apr. 11, 1972

[54] APPARATUS FOR AUTOMATICALLY MEASURING AND INDICATING BLOOD PRESSURE

[72] Inventor: Clifford Sanctuary, Palos Verdes, Calif.
[73] Assignee: Del Mar Engineering Laboratories, Los Angeles, Calif.
[22] Filed: Dec. 19, 1969
[21] Appl. No.: 886,654

[52] U.S. Cl. .................................128/2.05 M, 128/2.05 C
[51] Int. Cl. ..........................................................A61b 5/02
[58] Field of Search...................128/2.05 A, 2.05 M, 2.05 Q, 128/2.05 R, 2.05 S

[56] References Cited

UNITED STATES PATENTS

| | | | |
|---|---|---|---|
| 3,236,230 | 2/1966 | Follett | 128/2.05 A |
| 3,319,623 | 5/1967 | London | 128/2.05 A |
| 3,137,292 | 6/1964 | Richter et al. | 128/2.05 A |
| 2,827,040 | 3/1958 | Gilford | 128/2.05 A |
| 3,450,131 | 6/1969 | Vogt | 128/2.05 A |
| 3,051,165 | 8/1962 | Kompelien | 128/2.05 A |

Primary Examiner—William E. Kamm
Attorney—Smyth, Roston & Pavitt

[57] ABSTRACT

An automatic blood pressure measuring and indicating instrument is controlled with fail-safe features such as fast dumping pressure from an inflated cuff upon actual detection of diastolic pressure, a predetermined period after pump starting. The pump is turned off either when a selected pressure has been reached, or a predetermined period after starting. If measurement has not begun at that time, fast dumping is initiated. Signal processing to eliminate artifacts includes the elimination of Korotkoff sound detect signals neither preceded nor succeeded by another. Synthetized Korotkoff sounds are used to accommodate very low heat beat conditions. Different size cuff adaption is provided for.

18 Claims, 2 Drawing Figures

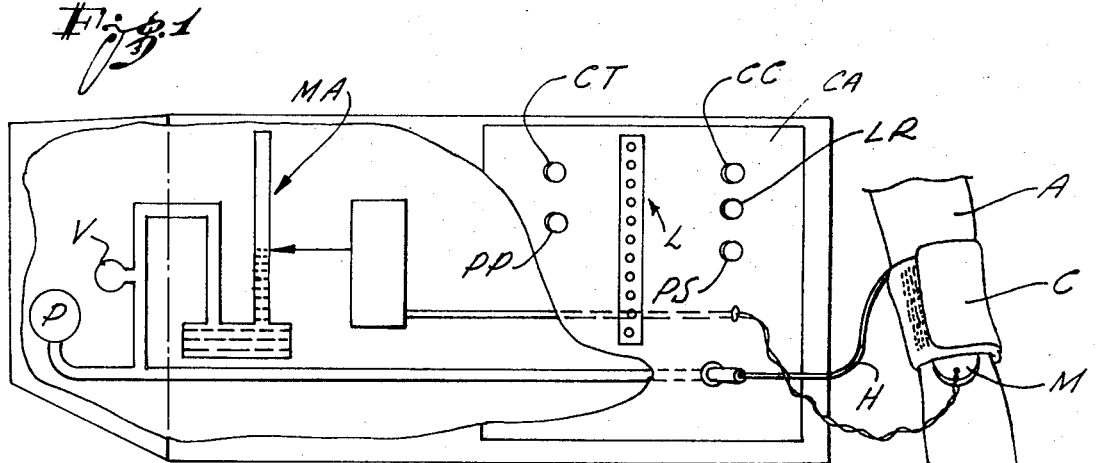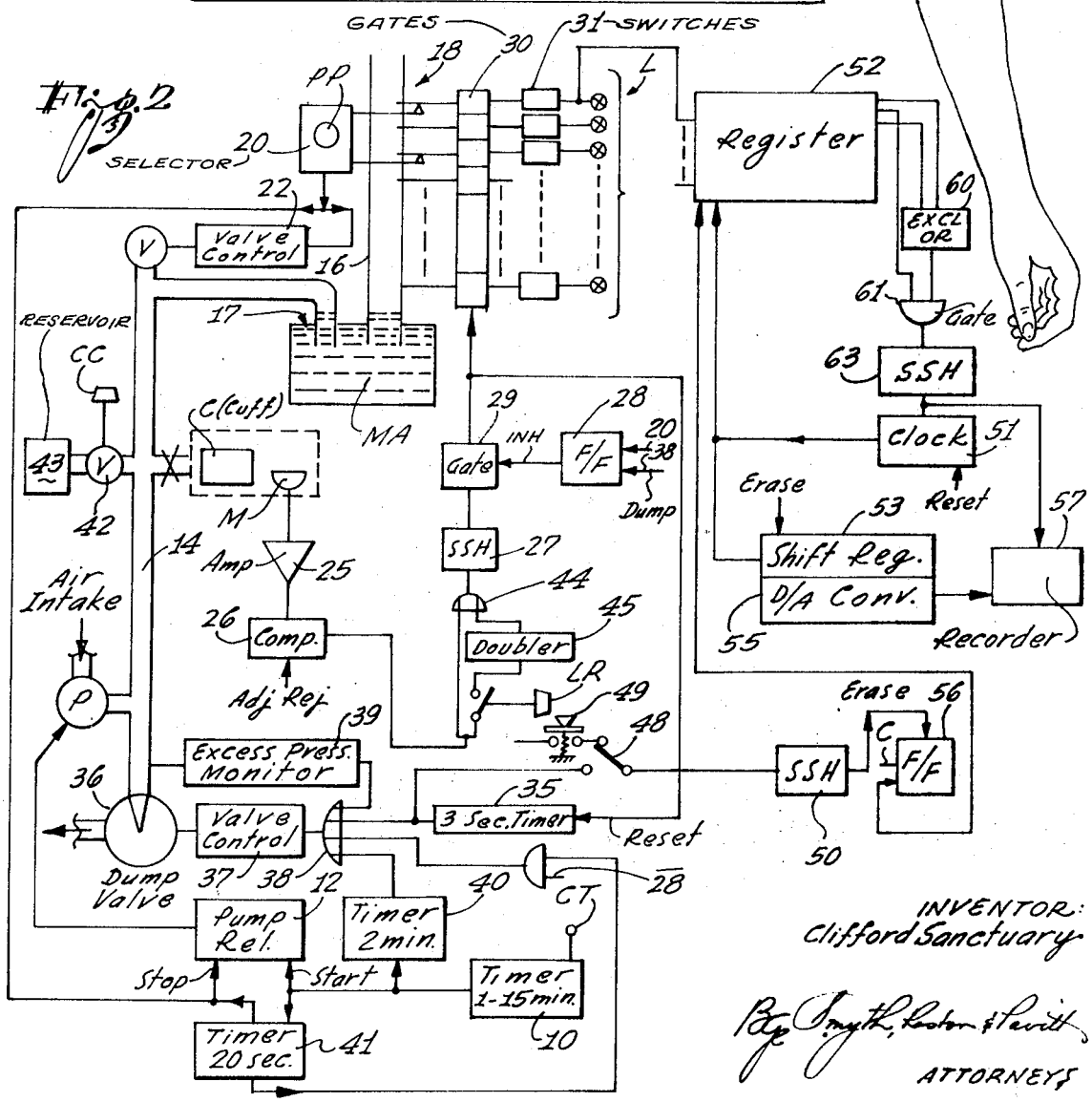

APPARATUS FOR AUTOMATICALLY MEASURING AND INDICATING BLOOD PRESSURE

This invention relates to the indirect measurement and visual presentation of systolic and diastolic blood pressure and particularly to a pressure sensing device equipped with features which permit blood pressure to be taken automatically and reliably by untrained personnel.

Numerous automatic apparatus for measuring and/or recording blood pressure are known and are disclosed in the patent art. Numerous of these employ the indirect method of measurement by means of an inflatable arm cuff which is pumped up, then allowed to descend in pressure while the characteristic "Korotkoff" sounds are detected to indicate the pressure values corresponding to systolic and diastolic blood pressures. Some of these disclosures show means of displaying or recording blood pressure values. Reference is made to U.S. Pat. Nos. 3,319,623 and 3,405,707 which disclose just such apparatus and adequately explain the historical background to the technique. The present invention discloses improvements to the apparatus previously known for measuring and recording blood pressure.

To be successful and reliable in clinical use, an automatic blood pressure measuring apparatus must be fail-safe and capable of performing this function quickly and safely on sick patients and well patients, on patients who may be moving parts of their bodies during measurement, on children as well as grown-ups, during periods of close supervision and when unattended, and to do so without injury to the patient in any way, even when component failures may restrict the performance of the apparatus. None of the previous devices has provided the means to adapt automatic blood pressure measurement to a wide variation of patient conditions and assure correct readings while adequately protecting the patient.

Accordingly, the invention provides improved means for inflating and deflating a compression cuff to a pressure somewhat in excess of the expected systolic pressure level and means for detecting the Korotkoff sounds and converting said sounds to reliable visual indicia in a fail-safe system. It is a principle feature of the invention to provide means to gain maximum speed, comfort and safety for the patient by providing automatic means to dispense with pressure at the earliest time in the pressure traverse cycle on bleed-down and to also dispense with pressure if the pumping equipment fails to meet predetermined performance schedules. The invention provides further a discriminator device to recognize and discard artifact values from the blood pressure measurement whether these indications are derived from conflicting sounds of clothing and muscular tissue in motion on the patient or from stray equipment inputs. An additional feature of the invention is in a single device, means to compensate for large variations in patient size.

A still further feature of the invention is an automatic means to accomodate the sick or resting patient who has a very slow heart rate. In accordance with the present invention in the preferred embodiment thereof, it is suggested to provide the following equipment:

An inflatable cuff is provided for attachment to a patients arms and selected in accordance with size. Generally, two sizes, adult size and child size, may suffice, but further differentiation is possible. A selectively operated pump, preferably started automatically at an adjustable repetition rate, inflates the cuff and is turned off if an adjustable peak pressure has been reached. For smaller cuffs an additional reservoir is brought in communication with the cuff, so that the available volume undergoing pressurization and subsequent depressurization remains independent from cuff size.

After peak pressure has been reached a linear bleeder valve vents the cuff at a controlled rate. The pressure in the cuff is monitored, and an electrical signal representation thereof is provided, preferably in steps. Sound detector means are attached, for example, to the cuff for attachment to the patient's arm. The detector output is processed to reduce the influence of low level noise, and to provide preliminary discrimination for detection of signals having characteristics of Korotkoff sounds. Such signals are correlated with the pressure representing signals to provide representation of detection of Korotkoff sounds at the various pressure levels from which, in turn, representation and indication of systolic and diastolic pressure are derived.

A column of lamps may be provided, associated respectively with the various pressure levels as traversed by the cuff pressure particularly during depressurization thereof. As the cuff pressure traverses the several levels (i.e., passes through the incremental intervals) associated lamps are turned on if a Korotkoff sound is received. At the end of a measuring cycle a group of lamps is lit forming a lit column, whereby the upper end thereof represents systolic pressure, and the lower end represents diastolic pressure.

Some isolated lamps, separated from the principal column of lit lamps, may have been turned on because of artifacts, i.e., because the sound sensing means and output signal processing circuit has responded to signals having characteristics of a Korotkoff sound as far as permissible equipment response is concerned but during a period (and cuff pressure) when true Korotkoff sounds are in fact not received. The human observer can disregard such isolated lamps, but further signal processing, particularly for recording, ascertainment of systole and diastole on basis of data acquisition involves further processing. For this, circuit means are provided to recognize a group of received signals having Korotkoff sound characteristic and identified by a particular regular association between progressing pressure representation and time of occurrence of the signals of the group. Regularity of mutual association of these signals of the group is established, for example by the requirement that at least one Korotkoff sound must appear per pressure level, identified and used as representation of scale, step or unit of the particular system, so that the pressure range between systole and diastole is defined by an uninterrupted sequence of pressure levels, progressively identified during falling cuff pressure with at least one signal of Korotkoff sound characteristics per level. A signal outside of that pattern of consecutive pressure levels is disregarded.

In case of low heart rate (i.e., low rate of Korotkoff pulses), the bleeder valve may vent too fast, so that the assembly of consecutive pressure levels, as aforedescribed, is disturbed. For this it is suggested to provide a delayed, synthetic Korotkoff signal for each detected signal having Korotkoff characteristics, to prevent generation of artificial gaps of intended uninterrupted representation in a group.

The cuff communicates with a dump valve for fast depressurization in timed relation to the pressurization. A regular measuring cycle is terminated by opening the dump valve shortly after Korotkoff sounds are ceased to be detected. As additional safety features, the dump valve is operated, independently from the operation of the measuring and Korotkoff sound processing circuit, a particular time after starting of pressurization and a particular time after termination of pressurization; the latter period is particularly short, almost marginal as far as expected duration of controlled pressure drops is concerned, to limit the period of conceivably maximum pressure in the cuff, should the bleeder valve not function and fail to depressurize.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a perspective, overall schematic representation of equipment improved in accordance with the invention; and FIG. 2 is a block diagram of that equipment showing the various features of the novel system.

Proceeding now to the detailed description of the drawings in FIG. 1, thereof, is illustrated an overall schematic view of equipment to be used for automatically and periodically taking, recording and indicating the blood pressure of a patient. The patient has, for example, a cuff C which remains tied and attached around his arm A. That cuff is inflatable and connected to a pump P which can raise the pressure in cuff C in order to compress the patient's arm as it is done usually and conventionally as a preparatory step for blood pressure measurement. The pump is disposed in a cabinet CA and is shown separately here only for illustration purposes. A hose H extends between cabinet CA and cuff C.

Coupled to the pressure system, i.e., to pump and cuff, is a manometer MA which includes a mercury column the meniscus thereof rising to a level depending upon the maximum pressure which has been pumped into the cuff. The manometer MA is, of course, also disposed in the cabinet CA. The mercury column drops if subsequently thereto pressure is gradually reduced by a linear bleeder valve V.

The cabinet CA includes electric circuitry which provides electric signal representation of the position of the meniscus of the mercury column which, in turn, represents cuff pressure. The systolic pressure is usually taken as the pressure during decompression when the Korotkoff sound can just be detected by a stethoscope while a slight pressure increase would again cause the sound to disappear. The diastolic pressure is represented by the cuff pressure when the Korotkoff sound can still be heard, while upon a slight additional pressure decrease the Korotkoff sound ceases to be heard.

In the equipment, as described here, systolic and diastolic pressure are determined in that manner respectively as appearing and disappearing of Korotkoff sounds at falling cuff pressure. The cuff, therefore, includes a microphone M which detects these Korotkoff sounds, and the electric circuit included in the cabinet processes occurrence and non-occurrence, within limits, of the Korotkoff sound in relation to the pressure as indicated by the position of the mercury column in the manometer MA. As a consequence of processing, a plurality of lamps will light up within a column L of such lamps. The upper end of the column of lit lamps, represents the systolic pressure, the lower end of this column of lit lamps represents diastolic pressure, provided all lamps between are gaplessly lit. The column of lit lamps itself reflects the blood pressure differential. The pressure values can be read directly from scale values printed next to these lamps.

Blood pressure reading is usually taken in steps of 5 mm mercury within the usual range, with 10, 20, or 25 mm steps in the higher pressure region. Those steps can be regarded as systems unit and define the measuring resolution for providing signal representation of cuff pressure and mercury column position. This unit of 5 mm mercury, as far as this representation is concerned, is basically arbitrary, but it was found that a finer scale division and more detailed reading would serve little purpose, as the degree of distinction between perception and detection thereof does not reasonably permit any more accurate reading.

The housing or cabinet CA, which includes this equipment, except the cuff, has a front panel with a display window which includes this column of lamps L. In addition, it has a number of adjustment buttons and setting switches. The first button is, of course, the power off- and on-switch PS. Next, there is selection switch CT for cycle time setting. Switch CT determines the frequency of automatically taking blood pressure on a repetitive basis. There may be a number of set points, such as 1 minute, 2, 3, 5, 10, and 15 minutes. As the switch CT is set for one of those set points, blood pressure measurement operations are repeated at that rate. The switch may have an "0" setting in which it operates as pushbutton to initiate a measuring cycle on demand only.

The next set switch, PP, determines peak pressure value, i.e., its position sets the maximum value up to which the cuff pressure is raised before it begins to drop for measurement of systolic and diastolic pressure. For example, a person having approximately 150 mm Hg blood pressure (systole) requires the cuff to be up to about 180 mm Hg or thereabouts, from which peak value the cuff pressure is caused to fall and appearance and disappearance of the Korotkoff sounds are measured. It would not serve any purpose and it would actually be quite uncomfortable, if for such a patient the cuff were pumped up to a peak pressure, for example, 250 mm mercury. However, there are, of course, patients which do have such high blood pressure (systole), in which case it is necessary to provide maximum or peak setting accordingly above.

Next, there is provided a switch CC which is placed in a position in case a child-size cuff with a smaller volume, as far as inflation is concerned, is used. The "child-cuff" switch, when in "on" position, connects a resilient reservoir to the air pumping system, so that the total volume exposed to the pumped air is the same as in case of a normal size cuff. Next there is a low rate compensator switch LR which is placed in on position in case the person tested has a rather low heartbeat rate. The switch should be placed in "on" position when the heartbeat rate is below the rate of pressure drop, in units of the pressure detection steps (5 mm Hg) per unit time. The reason for this switch will also be explained below.

After having described the overall-layout of the system improved in accordance with the invention, we turn now to FIG. 2. The various elements of the system disclosed in FIG. 2 will be described in the order of their becoming particularly effective during a blood pressure measurment cycle.

There is, first provided a timer 10, having selectable or presettable delay periods to be adjusted by knob CT. In effect, the timer 10 is a low frequency oscillator with adjustable frequency. It issues a trigger, control or starting pulse each time the period for which knob CT is set has elapsed. As was mentioned above, the range that for this period may be selected from, for example, from 1 minute to a quarter of an hour, or the selector pushbutton CT is set to "0" for demand operation causing the timer to provide an output once and without delay.

The starting output pulse provided by timer 10 operates primarily to start or to turn on a pump control relay 12 which, in turn, starts the air pump P. Pump P pumps air into an air pressure system which includes a manifold 14 to communicating with bleeder valve V and manometer MA. Particularly, manometer input 17 connects to manifold 14. The principle function of pump P is to pump air into the inflatable cuff C which is also connected to manifold 14. The cuff C exerts pressure on the arm in a regular manner as it is practiced for taking a blood pressure reading.

As pressure in the pressure system, and particularly in cuff C increases, mercury begins to rise in a pipe 16 pertaining to a regular manometer system MA. Pipe 16 is provided with a plurality of feeler contacts 18 projecting into the interior of pipe 16 for making contact with the mercury therein if it has risen to the respective level of a contact of the plurality. These feeler contacts 18 are spaced apart vertically and preferably at equidistant spacing over the main measuring range, corresponding to a pressure differential of 5 mm of mercury as between two juxtaposed contacts.

The contacts of the plurality 18 cover in particular a range which the mercury column is expected to traverse when the cuff pressure varies, from somewhat above "high" systolic pressure and to somewhat below "low" diastolic pressure. During rising pressure in cuff and manometer input, progressive number of contacts, from below, make contact with the mercury; during falling pressure, progressive numbers of contacts (from above) disengage from the mercury. These contacts are, of course, insulated from each other and pass insulatedly through the pipe 16 which is preferably and usually made of glass or plastic.

Some of the contacts 18, namely some of those in the upper part of pipe 16, connect respectively to a plurality of input contacts of a selector arrangement 20, operated by the peak pressure selector button or knob PP. That selector knob thus makes contact with one of the several leads as leading to some of the contacts 18 to select a particular pressure as peak value up to which the pump is to pressurize the system during each pump-up operation (and during each succeeding cycle as repeated at the cycle rate of timer 10 as long as the setting of knob PP is not changed).

In a typical example, selector 20 may connect to contacts of the plurality 18 respectively representing 290, 250, 200, 150, and 130 mm Hg pressure. The output of selector 20 is taken from a wiper contact as operated by knob PP, whenever the mercury in pipe 16 engages that one of the contacts 18 selected by the setting of selector 20.

As the pump has pressurized cuff and manometer to a maximum pressure as selected, i.e., as the mercury in column 16 has reached the level of that particular one of contacts 18 connected to the contact of selector 20 as selected by the particular setting of knob PP, a turn-off pulse is developed in a convenient manner. The mercury itself may be electrically biased to change voltage potential of any contact with which it comes into contact. The resulting electrical signal in the selector 20, when the mercury has reached the selected contact during pump-up, is used for stopping the pump by controlling turn-off or deactivation of pump relay 12.

The signal, indicating that selected maximum pressure has been reached, can also be used to activate a valve control circuit 22 causing the bleeder valve V to open. Control valve 22 is not an essential element and can be dispensed with, if the pump is fast enough, particularly considerably faster in pressurizing the system than air is vented out of the pressure system through venting bleeder valve V; in this case bleeder valve V may remain open at all times and in direct communication with the manifold 14.

The pumping and raising of pressure in the pressure system is, in fact, a preparatory step for blood pressure reading. As the pump stops, and as bleeder valve V is open or its venting prevails, pressure in cuff and manometer begins to fall. The bleeder valve V is constructed as a linear valve, i.e., the *rate* of pressure drop is essentially independent from the pressure differential between cuff C and the exterior. As the pressure drops, the mercury column drops accordingly, covering the entire range from selected peak pressure to pressure equilibrium with the exterior. The purpose of the equipment to be described next is to detect, during this rather slow pressure drop, the pressure range in which Korotkoff sounds can be heard and to detect particularly the pressure value for the first occurrence of a Korotkoff sound, as well as the pressure value for last occurrence, respectively in representation of systolic and diastolic blood pressures.

It was mentioned above the cuff C is provided or associated with a microphone M. The microphone M is connected by means of a suitable cable, with an amplifier 25. This amplifier or a pre-stage thereof in miniature configuration may actually be already located in cuff C or be attached to the cuff or its output stage or the entire amplifier may be disposed in the main cabinet CA. Amplifier 25 has a peak response at 40 Hz ±1 Hz with a roll-off at least 20 db for high frequencies to eliminate any 60 Hz hum from the system. Lower frequency cut-off is not particularly important but it was found that the amplifier should have definite band pass characteristics with cut-off frequencies above *and* below a peak of 40 Hz.

In essence then, amplifier 25 responds particularly to the signal flanks and low audio frequency components which accompany each Korotkoff sound. The pulse or repetition frequency of the Korotkoff sound itself is, of course, the heart-beat rate which is in the order of a few or less hertz. This frequency is outside of the passband of the amplifier. This is important as the system should not respond to pulse.

The output of amplifier 25 is in effect a pulse or sequence of narrow speed pulses for each Korotkoff sound, and is fed to a comparator 26. The principle function of the comparator 26 is to insert an adjustable reference and threshold into the system. That reference, on one hand, is selected to eliminate as much as possible body noise or other signals within the amplifier pass band which may be picked up by microphone M. The selection of that reference is rather critical and it is, in effect, an electrical equivalent for a signal amplitude regarded as being at the audible threshold for the Korotkoff sound, as that is the criterion used for determing absence or presence of a Korotkoff sound. The signal from amplifier 25 must thus exceed this threshold selected to be between noise level and audible threshold equivalent in order to be recognized as a signal representing a detected Korotkoff sound. It is, however, this aspect which renders the system highly reliable as it provides with certainty for comparable measuring results, from one measurement to the next one, and eliminates variations which occur if different people take blood pressure reading by directly listening to the Korotkoff sound.

The output of comparator 26 is fed to a single shot or monostable multivibrator 27 to provide a particularly single pulse response to the leading steep flank of any output of amplifier 25 passing comparator 26. The monovibrator 27, therefore, provides in effect a pulse representing in suitable format the detection of a Korotkoff sound regardless of the configuration thereof. It should be interjected here, that Korotkoff sounds vary widely from patient to patient.

The electric circuit system, as described so far and as connected to microphone M, can actually be connected to the system at all times. However, in between measuring cycles, and, most importantly, during pump-up, the microphone will pick up noise of various kinds including the pumping noise and other artifacts, such as reaction of the patient to pump-up. Thus, output pulses of single shot 26, either their production or their utilization, should be restricted to the measuring period proper, when the pressure drops in cuff and manometer.

There is provided a flip-flop 28 which receives, for example, a set input from the output of selector 20 which marks the instant that pressure drop and measurement proper begins. The flip-flop is reset sometimes after the pressure has dropped below the diastole. The set state of flip-flop 28 defines the measuring period proper of each blood pressure taking cycle and can be used generally as enabling signal in the system. Presently, the flip-flop 28 provides an enabling signal to a gate 29 so that any output pulses of single shot 27 are inhibited from propagating further, prior to the beginning of controlled pressure drop in the pressure system. In the following, output pulses from gate 29 will be called Korotkoff pulses with the understanding that artifacts may, at times, simulate Korotkoff pulses. Discrimination (other than the pass band filtering in amplifier 25) is done at a later stage.

The output pulses from gate 29 are fed into and through a gate assembly 30. In essence, this gate assembly 30 has as many logic gates as there are contacts 18. Implementation of these gates is subject to a variety of choices, functionally, it is convenient to consider them as realizing and exclusive OR function for analyzing Korotkoff pulses.

Each of these gates derives two of its inputs as logic inputs from a pair of contacts of the plurality 18, one above the other. One can, therefore, say that these two contacts select a pressure scale value half way between them, at a resolution ±2.5 mm Hz. The connection may run in such a manner that an electric potential is applied to the mercury in manometer MA, and is permitted to be fed to those gates having input contacts engaging the mercury. However, a gate is enabled only if the upper one of the contacts of a pair connected to it, does *not* engage mercury, i.e., is above the meniscus of the mercury column and, therefore, does not receive the signal fed through the mercury, while the lower one of the particular pair *does* engage the mercury column to receive that signal, the meniscus thus being somewhere in between the two contacts within the pipe 16.

Each of these gates of gate assembly 30 realizes the exclusive OR function as to pairs of signals derived from the mercury column. It follows, therefore, that in any instant only one of these gates in the gate assembly 30 has a true output for realizing the exclusive OR function and is enabled accordingly. The gates which are connected to contacts, none of which or both of which are in contact with mercury, are disabled by operation of the exclusive OR FUNCTION. As the pressure in the pressure system is reduced, and the mercury column in pipe 16 falls, this state of enableness of one of the gates of gate assembly 30 to the exclusion of the remaining gate is likewise shifted "down."

Each of these gates is now connected to receive in addition the output pulse of single shot 27, i.e., it provides the AND function for each detected Korotkoff pulse. This electric realization of the state of enableness for receiving and passing Korotkoff pulses is a progressing signal representation of the current cuff pressure and correlates cuff pressure with Korotkoff sound detection. The output of each gate controls a switch of a set of switches 31, each of which controls one lamp of the set of lamps L. If a gate of the gate assembly 30 is enabled and receives a Korotkoff pulse, it turns the respectively connected lamp on.

It can, therefore, be seen, that as pressure drops in the pressure system, beginning with the rather high, selected pressure, and known to be above the systolic pressure of the patient as can reasonably be expected, then in the upper range of falling pressure some Korotkoff sounds will not be detected; i.e., in a "noiseless" mode of operation none of the signals picked up by the microphone will cause the threshold reference of converter 26 to exceed. Therefore, even though gates are sequentially enabled in the higher pressure region, switches 31 are not turned on and the corresponding lights remain off. As about systolic pressure is reached, the first Korotkoff sound will be detected. Accordingly, an output pulse is provided by single shot 27, and it turns on one of the lamps L. As the pressure drops further, of course, additional Korotkoff sounds will be received and additional lamps will be turned on provided the pressure drops from level to level at a rate slower than the heartbeat rate. This will continue until the pressure drops below the diastolic level, whereupon single shot 27 will not be triggered and the lamps associated with the respective pressure indicator gates remain off.

It appears, therefore, that at the end of a run, an upper portion of lamps L will remain off, then there are several lamps turned on, and the lower portion of the lamp column will again be off. The upper end of the particular group of turned-on lights identifies the thus readily detectable systolic pressure and the lower end of the lit lamp column identifies the diastolic pressure.

In the normal, undisturbed case, there will be an uninterrupted column of lit lamps, bounded by off-lamps above as well as below in the vertical column of lamps L. However, artifacts may have simulated signals of sufficient amplitude that caused the single shot 27 to be triggered so that one or the other seemingly isolated lamp within the group of off-lamps and outside of the continuous group of on-lamps, has also been turned on. One can expect that even an untrained person, upon reading systolic and diastolic pressure from the light column, disregards such isolated turned-on lamps. One could, however, provide additional logic circuits to turn a lamp off again if the one above and the one below has remained off.

The lamps which were turned on may remain on for a specified time, for example, until turned off manually or upon beginning of the next measuring cycle as automatically induced by timer 10. The turn-on states of lamps as provided in the system and as represented electrically therein, serves also a storage of electrical signals representing pressure values (or incremental ranges) during which Korotkoff sounds were in fact detected. These electrical signals may be processed further as will be described below. The turning on of the last one of a Lamp L actually completes the measuring as far as immediate visible indication is concerned, but termination of a measuring cycle is controlled as follows:

A timing circuit 35 has also been indirectly input-enabled by the set state output of flip-flop 28 (but not started), as its input is dependent upon the output of gate 29. The timing circuit can best be described as a reset integrator serially combined with a Schmitt trigger having leading edge differentiating output to provide an output pulse only upon triggering of the Schmitt trigger but not upon release thereof. Timing circuit 35 has, for example, a delay period of 3 seconds.

The timing circuit 35 has its input connected to be reset with the first and each subsequent detected Korotkoff pulse. Therefore, after diastolic pressure has been taken, no more Korotkoff sounds appear (or should appear) and no reset signals are applied for timing circuit 35 which is permitted to run for the 3 seconds accordingly. The output produced thereafter is used to switch on control circuit 37 which, in turn, controls a dump valve 36. An OR-circuit 38 is symbolically included to indicate that the output of resettable timer 35 is but one input for the valve control 37.

The dump valve 36 rapidly discharges remaining pressure in cuff and manometer, to rapidly remove discomfort from the patient long before pressure relief through the relatively slow bleeder valve V can be obtained. Finally, the output of OR-gate 38 (in this case now the output of timer 35) is used to reset flip-flop 28.

The system as described thus far, is additionally provided with a plurality of safety features of particular importance which are described next. Some of them have already been mentioned. First of all, the period of pressurization in the cuff should remain as short as possible. One of the instrumentalities is the selector 20 for adjusting the peak pressure of pump-up, so that slow pressure drop begins at a maximum which can be selected to be only somewhat above the expected maximum systolic pressure.

Next, there is the provision just mentioned, permitting rapid depressurizing of the cuff shortly after diastolic pressure has in fact been ascertained (timer 35). There are now additional conditions under which the pressure will be released rapidly from the system.

First of all, control 37 is constructed so that in case of electric power failure, dump valve 36 opens. Next, there is provided an excess pressure meter 39 which is a safety device responding particularly to a maximum pressure above any of the selectable peak pressures and independently from the electrical system. If, for reason of an equipment failure, the pump is not turned-off, particularly in response to the selected peak pressure level, excess pressure monitor 39 directly opens the dump valve 36. It is presumed particularly, that the dump valve vents the pressure system faster than the pump 13 can repressurize it.

Other features of the invention are concerned with various kinds of equipment failure that may occur for any reason. The pressure pump P may have been turned on, but, for some reason, such as leakage, the pressure does not rise or rises too slowly so that the pump tends to raise the pressure with little or no success. Therefore, there is a timer 41, which is activated and begins to run concurrently with starting of pump P; the output of cycle timer 10 is also a trigger signal for timer 41. Thereupon, a somewhat arbitrarily selected safety period, for example 20 seconds, begins to run. After 20 seconds dump valve 36 will open to decompress the cuff, if the pump was not switched off in response to the output of selector 20 prior to that time. Conveniently, the reset output of flip-flop 28 can be used to inhibit the connection between timer 41 and OR gate 38 after the flip-flop has been set in response to an output of selector 20.

There is a second timer 40 which starts to run when the pump is being turned on, i.e., in response to the output of the selector timer 10. The timer 40 has a delay period of about 2 minutes. In essence, it monitors whether within that 2-minute period measuring has been completed. The bleeder valve V may not operate properly or not at all, so that the arm of the patient may remain compressed at or near peak pressure. Timer 40 limits that to maximal 2 minutes.

That period is intentionally selected to be rather marginal and will, in fact, have run quite shortly after the cuff pressure has dropped below the diastole during normal operation.

It is inconvenient and particularly uncomfortable in cases, to use the same size cuff for all patients. At least one smaller size cuff should be provided for use with children. In order to maintain the operating conditions it is necessary to place a reservoir 43 in communication with the pressure system.

Thus, if a smaller size cuff is connected to the unit, a valve 42 is opened by setting switch CC and reservoir 43 is allowed to fill concurrently with the cuff. The reservoir is resilient and together with the child size cuff it offers the same volume as the adult size cuff has. As peak pressure has been reached, the outflow rate of air through the bleeder valve V and the corresponding rate of pressure reduction will now be the same as for the adult size cuff without inclusion of the reservoir.

As was mentioned above, in case of a lower heart rate and for a particular venting speed, there may not be enough Korotkoff sounds to turn on all lamps between systolic and diastolic pressure level. For example, if the pressure levels (contact spacing in column 16) are spaced apart at 5 mm Hg intervals, if the cuff pressure reduces at a rate of 5 mm Hg per second, then at a heart rate of less than 60 beats per second, it may occur that a gate of the assembly 30 is enabled after one Korotkoff sound and is disabled again before the next one. Accordingly, there will be a gap (or several) in the column of lip lamps. Moreover, the circuit to be described later will provide erroneous processing.

To obviate these difficulties, there is provided a pulse doubler 45 selectively placed in circuit by the lower rate switch LR. For each Korotkoff sound it synthetizes another one, for example, one-third of a second later. This actually simulates a heart rate doubling.

Next, I proceed to the description of circuitry designed to process the result of a pressure dependent Korotkoff sound detection run to ascertain numerically the systolic and the diastolic pressures in a manner which can be described generally as recording and/or data acquisition. After the system (cuff and manometer) has depressurized, the result of the pressure dependent Korotkoff sound detection is actually stored, for example, in the electric state of the switches 31. A switch having turned on a lamp and keeping it on provides and maintains an electrical representation of the fact that a signal having Korotkoff sound characteristics was detected during the period when the mercury dropped from the level of one of the contacts 18 to the next lower one, which represents an incremental pressure range, or defines a pressure level of a mercury column position half way between the two contacts, in representation of a scale and resolution of the particular pressure measuring and detecting system.

Now systolic and diastolic values have to be derived from the collective condition of states of the switches 31. This can be done at any time after depressurization, prior to the next measuring cycle and run, automatically or on demand. Depending upon setting of a selector switch 48, an output signal as trigger signal for the circuitry to be described next, is derived either from a demand key 49 or from the output of timer 35 which provides the termination signal of a completed cycle.

This trigger signal triggers a single shot 50 providing a signal to be used generally for clearing, erasing, resetting and starting. The signal in particular resets a shift-clock 51, it resets and clears a shift register 52 and a serial input register 53 of a digital to analog converter 55. Finally, an initial set flip-flop 56 is set (unclocked mark or DC setting).

The set state of flip-flop 56 is used to enable a set of parallel input gates of shift register 52 coupling the signals defining the state of relays or switches 31 to the several stages of register 52. After the period of single shot 50 has run, clock 51 begins to run likewise providing synchronous shift pulses for both shift registers 52 and 53. Moreover, the first clock pulse resets a flip-flop 56.

At this point, register 52 holds the measuring result in digital form. For example, "ones" for each pressure level, identified by exclusive OR enabling of a gate of gates 30 and where a signal having Korotkoff sound characteristics was received and derived as a pulse from gate 29, a stage in register 52 receives a "zero" where the corresponding gate of gate assembly 30 was enabled but did not receive a signal from gate 29. The second stage of highest order, i.e., the next one to the serial output stage of register 52 receives bi-valued representation of whether the meniscus of the mercury column reached highest detectable position during pump-up *and* a signal with Korotkoff characteristics was received at that time. The next lower stage receives similar information correspondingly related to the next lower distinguished pressure level, etc. It is important to note, that the highest stage of register 52 is associated with the highest possible manometer pressure and does not (usually) receive representation of selected peak pressure, as the latter is variable while the connection between storage relay 31 and register 52 is fixed.

The synchronized clock 51 can, in fact, be interpreted as a scanner or interrogation device, as each clock pulse sets the Korotkoff signal detection results into the second stage of register 52 on a pressure level per level basis and in the sequence of the various available levels of the manometer-contact system (MA–18) along the column 16, beginning, for example, with the highest one, and from there down from level to level at clock rate. Concurrently thereto, shift register 53 builds up a digital representation of the pressure levels thus scanned; the initial state of register 53 corresponds to a digital representation of the highest pressure level of the manometer, the first clock pulse establishes a state corresponding to the next lower pressure level, the next pulse shifted into register, together with the first one having been shifted further into the register by one step, establishes digital representation of the second lower pressure level of the system, etc.

As the clock progresses, the content of register 52 is progressively shifted into the output stage and either recycled or extinguished, as desired. Usually there will be first a plurality of "zero" bits followed by a plurality of "one" bits and followed in turn by a sequence of "zero" bits. The "ones" when in the second stage represent Korotkoff pulse detection at the particular pressure as concurrently digitally represented by the content of register 53.

It can be seen readily, that at any instant register 52 presents Korotkoff sound detection representation at its second-to-output stage and correlated with the digital content in from register 53 providing pressure level association. These signals can be processed particularly for systole and diastole detection and representation as signals. For this, it must be described why the second stage, next to the output stage in register 52 is significant.

The output stage of register 52 and the third one down are coupled to an exclusive OR-gate 60, the output of which is one input of a two-input AND-gate 61, receiving the other input from the stage in between, which is the second highest order stage of shift register 52. As a consequence, the output of the gate 61 turns true only if the three high order stages in register 52 hold the digit combination (110) or (011).

The bit combination (0,1,1) is to be understood to represent a "0" in the output stage and two "ones" in the two lower stages. This combination occurs only if the "one" bit in the second stage represents the first true Korotkoff sound reception at the systole. The bit combination (1,1,0) correspondingly defines the diastole level, the "one" in the second stage being a last "one" in the sequence of detected Korotkoff pulses near and at the diastole level. Each situation occurs, when the second highest stage or register 52 holds a "one" with two dissimilar bits in the stages above and below, which is the reason the second high order stage is the stage the clocking and content of which must be correlated with the buildup of digital representation of the pressure drop in register 53.

An artifact that occurred when Korotkoff sounds were not perceivable will be represented as a (0,1,0) bit combination in three successive stages as initially loaded into register 52. As such a bit combination is shifted into and appears in the three high order stages of the register, it is simply disregarded in operation of the gate assembly 60–61.

It will readily be seen, that as far as the output of gate 61 is concerned, it turns true only when concurrently the digital pressure drop representation in register 53 is that of the systole or of the diastole pressure level, first the former then the latter, if, as presumed here, the direction of data sampling during a test cycling, which is defined by the period of falling cuff pressure (set state of flip-flop 28). However, the shifting direction could well be reversed, i.e., there is no inherent need in processing the data in the same sequence in which they were sampled.

The output of gate 61 when true is used to trigger a single shot 63. The resulting signal serves as a temporary disabling signal for clock 51 to interrupt data shifting and to halt the building up of digital representation of the pressure in register 53. The principle purpose of the output signal of single shot 63 is to identify the content of register 53 at that time as a representation of systolic and diastolic pressure. At the chosen direction, the first signal of single shot 63 identifies systole, the next diastole.

During each processing run gate 61 will turn true, normally only twice. It could turn true any even number of times, but the other cases are readily ascertainable as errors. Concurrently, with each signal from single shot 63 the digital-to-analog converter 55 provides an analog representation, again of the systolic pressure first and of the diastolic pressure thereafter. The output of single shot 63 now operates in effect as a trigger or enabling signal to operate a recording or any other data acquisition device 57 to record, to receive or to control inputting of the output d/a converter 55 at that time. If the device 65 is a digital device, the bit combination held in register 53 may be copied directly, as digital signals into device 57 and in response to an output of single shot 63 (which may function as an external computer interrupt).

By way of example and for on-location processing, device 57 may be a plotter. The plotting arm deflection is controlled by the analog output of converter 55, possibly throughout the process as described. Each pulse from single shot 63 is used to obtain a recording dot, one chart, for example, by heating of ink of a writer in contact with the chart, or by deflecting a stylus towards a record sheet or roll, for punching a hole, writing a dot, providing a magnetic marker, etc.

What is claimed is:

1. An apparatus for automatically measuring blood pressure and for providing an indication thereof, comprising:
   an inflatable cuff for mounting on a patient;
   controllable air pump means; conduit means connecting the pump means to the cuff for inflating the cuff upon operation of the pump means;
   a relatively slow time linear operating bleeder valve positioned in the conduit means, intermediate the pump means and the cuff, for slow decompression of the cuff at a particular rate;
   selective operating means for operating the pump means to increase pressure in the cuff to a selectable value and including means to stop the pump means when the selected pressure has been reached so that the cuff can decompress by operation of the bleeder valve;
   a relatively fast dump valve in communication with the cuff to rapidly decompress the cuff;
   first means including electric circuit means connected to be responsive to the pressure drop in the cuff to provide progressing signal representation thereof;
   sound detecting means for positioning in relation to the cuff to detect Korotkoff sounds;
   control means including timer means operating in timed relation to operation of the operating means, for opening the dump valve in dependence upon absence of a Korotkoff sound for a predetermined period;
   second electric circuit means connected to the first circuit means and to the sound detecting means to provide representation of absence and presence of Korotkoff sounds in correlation to the pressure drop as represented by the progressing signal representation; and means connected to the second circuit means to provide an indication of systolic and diastolic pressure.

2. Apparatus as in claim 1, the control means including a timer connected to switch off the pump and operate the dump valve a particular period after starting of the pump.

3. Apparatus as in claim 1, the control means including a timer connected to operate the dump valve a particular period after starting of the pump, and long enough to complete systole and diastole measurements.

4. Apparatus as in claim 1, the timer in the control means including a resettable timer, the timer starting to run anew with each resetting and connected for being reset in response to detection of each Korotkoff sounds, failure of resetting causing the timer to provide a delayed output, the timer further connected to the dump valve for operating the dump valve in response to said delayed output.

5. Apparatus as in claim 1, the second circuit means operating in particular relation to the pressure drop in the cuff to render recoginition of a signal as detected by the sound detecting means as a Korotkoff sound dependent upon particular subsequent occurrence of a similar signal at a lower pressure level for obtaining representation of the systolic pressure, and further dependent upon repetitive, prior occurrence of signals for obtaining representation of the diastolic pressure at higher pressure level followed by absence of a signal at a lower level.

6. Apparatus as in claim 1, the second circuit means including means to provide a synthetic Korotkoff sound signal in particular delayed relation to a detected Korotkoff sound signal, the delay being shorter than the next true Korotkoff sound signal to be expected.

7. Apparatus as in claim 1, the control means including plural individual timers for operating the dump valve independently from each other and at particular periods respectively after beginning and end of operation of the pump means.

8. Apparatus as in claim 1, the selective operating means including a first variable, cyclically operating timer for automatically starting the pump at the selected cycle rate.

9. Apparatus for automatically measuring blood pressure and for providing an indication thereof, comprising:
   an inflatable cuff for attachment to a patient;
   controllable air pump means; conduit means connecting the pump means to the cuff for inflating the cuff upon operation of the pump means;
   a relatively slow bleeder valve positioned in the conduit means; intermediate the pump means and the cuff, for slow decompression of the cuff at a particular rate;
   selective operating means to operate the pump means to increase the pressure in the cuff up to a selectable value and including means to stop the pump means when the selected pressure has been reached so that the cuff can decompress by operation of the bleeder valve;
   first circuit means connected to be responsive to the pressure drop in the cuff to provide progressive signal representation thereof;
   sound detecting means positioned in relation to the cuff to provide signals in representation of Korotkoff sounds;
   second circuit means connected to the first circuit means and to the sound detecting means to correlate the signals as detected by the sound detecting means and the signal representation of the pressure drop as provided by the first circuit means, to recognize a consecutive group of signals in particular timing as Korotkoff sounds to the esclusion of signals having characteristics similar to Korotkoff sound signals as to response to the sound detective means, but occurring untimely in relation to the group, and including first particular circuit means to be responsive to absence of a detected Korotkoff sound followed by presence of two such sounds at different lower pressure levels, to establish representation of systolic pressure, and further including second particular circuit means to be responsive to presence of two Korotkoff sounds at two different pressure levels followed by absence of such sound at a still lower pressure level, to establish representation of diastolic pressure, the first and second particular circuit means operating in response to the signal representation as provided by the first circuit means; and
   means for deriving indications of systolic and diastolic pressure from the first and second particular circuit means.

10. Apparatus as in claim 9, the first means providing stepwise representation of pressure drop; the second circuit means recognizing a signal as a Korotkoff sound during one step if there was a similar signal during the next or during the preceding step.

11. Apparatus as in claim 10, there being means to synthesize a delayed signal in response to each detector signal, the delay being shorter than the rate of step changes of the representation of pressure drop, the means provided for deactivation if the Korotkoff sound rate (heart or pulse rate) is higher than the step rate.

12. Apparatus as in claim 9, the second means including means for storing representation of correlated signal representation as provided by the first means and of detected signals; and means for processing the stored representation to select consecutive groups of signals as a group of Korotkoff sounds, and to derive therefrom signal representation of systolic and diastolic pressures.

13. Apparatus as in claim 9, the first means providing stepwise representation of pressure drop, the second means providing and storing individual representation of occurrence of at least one signal from the sound detecting means having characteristics of a Korotkoff sound during each step; and means operating to detect a group of stored signal representation for a continuous group of steps to represent the pressure range between systolic and diastolic pressure.

14. Apparatus is in claim 14, the operating means triggered for operation in timed relation to the last signal having Korotkoff characteristic during declining pressure in the cuff.

15. Apparatus as in claim 14, the operating means triggered on demand and cooperating with the indicating means for providing a graphic readout.

16. Apparatus for automatically measuring blood pressure and for providing an indication thereof, comprising:
an inflatable cuff for attachment to a patient;
pump means in communication with the cuff for inflating the cuff;
a relatively slow bleeder valve positioned intermediate the pump means and the cuff for slow decompression of the cuff at a particular rate;
selective operating means to operate the pump means to increase the pressure in the cuff for a selectable value and including means to stop the pump means when the selected pressure has been reached so that the cuff can decompress by operation of the bleeder valve;
first circuit means connected to be responsive to the pressure drop in the cuff to provide progressive signal representation thereof;
sound detecting means positioned in relation to the cuff to provide signals in representation of Korotkoff sounds;
second circuit means connected to the first circuit means and to the sound detecting means to correlate the signals as detected by the sound detecting means and the signal representation of the pressure drop, to recognize a consecutive group of signals in particular timing as Korotkoff sounds to the exclusion of signals having characteristics similar to Korotkoff sound signals as to response to the sound detective means, but occurring untimely in relation to the group;
third circuit means included in the second circuit means to synthetize a signal to be recognized in delayed response to each Korotkoff sound detected by the sound detecting means, to compensate for slow heart beat rates; and
means for deriving indications of systolic and diastolic pressure from the second circuit means in response to signal, representation as provided by the first circuit means as correlated with the recognized consecutive group of signals.

17. An apparatus for automatically measuring blood pressure and for providing an indication thereof, and for cooperating with one of a plurality of differently sized inflatable cuffs, comprising:
an inflatable cuff, being one of the plurality of cuffs;
pump means in communication with said one cuff for inflating the cuffs;
a relatively slow, bleeder valve positioned intermediate the pump means and the cuff for slow decompression of the cuff at a particular rate;
selective operating means for operating the pump means to increase pressure in the cuff to a selectable value and including means to stop the pump means when the selected pressure has been reached so that the cuff can decompress by operation of the bleeder valve;
a resilient, inflatable reservoir, for receiving air in parallel to the cuff;
valve means for connecting the reservoir to the cuff if the cuff used is smaller than normal, the resiliency being such that upon concurring inflation and deflation, the combination of the smaller cuff and reservoir provides the same changing expanding and contracting volume as does a normal cuff when it is connected to the pump means, while the valve means has disconnected the reservoir;
first means including electric circuit means connected to be responsive to the pressure drop in the cuff to provide progressing signal representation thereof;
sound detecting means for positioning in relation to the cuff to detect Korotkoff sounds;
second electric circuit means connected to the first circuit means and to the sound detecting means to provide representation of absence and presence of Korotkoff sounds in correlation to the pressure drop as represented by the progressing signal representation; and
means connected to the second circuit means to provide an indication of systolic and diastolic pressure.

18. An apparatus as in claim 17 and including a relatively fast dump valve in communication with the cuff to rapidly decompress the cuff, and including control means operating in timed relation to operation of the operating means, for opening the dump valve.

* * * * *